United States Patent
Papakipos et al.

(10) Patent No.: US 7,081,895 B2
(45) Date of Patent: Jul. 25, 2006

(54) SYSTEMS AND METHODS OF MULTI-PASS DATA PROCESSING

(75) Inventors: Matthew N. Papakipos, Palo Alto, CA (US); Rui M. Bastos, Santa Clara, CA (US); Christian Rouet, San Francisco, CA (US); Shaun Ho, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 426 days.

(21) Appl. No.: 10/411,940

(22) Filed: Apr. 11, 2003

(65) Prior Publication Data

US 2004/0012563 A1    Jan. 22, 2004

Related U.S. Application Data

(60) Provisional application No. 60/397,150, filed on Jul. 18, 2002, provisional application No. 60/397,247, filed on Jul. 18, 2002.

(51) Int. Cl.
*G06T 1/20* (2006.01)
*G06F 15/16* (2006.01)
*G09G 5/00* (2006.01)

(52) U.S. Cl. ............... 345/506; 345/503; 345/419; 345/582

(58) Field of Classification Search ............... 345/537, 345/157, 582, 539, 426, 615, 505, 506, 600; 708/204
See application file for complete search history.

(56) References Cited

U.S. PATENT DOCUMENTS

| 6,018,353 A * | 1/2000 | Deering et al. ............ 345/537 |
| 2003/0163502 A1* | 8/2003 | Abe et al. .................. 708/606 |
| 2004/0012563 A1* | 1/2004 | Papakipos et al. .......... 345/157 |

* cited by examiner

*Primary Examiner*—Ulka Chauhan
*Assistant Examiner*—Dalip K. Singh
(74) *Attorney, Agent, or Firm*—Patterson & Sheridan, L.L.P.

(57) ABSTRACT

Method and apparatus for graphics processing is described. More particularly, a graphics processing subsystem capable of multi-pass graphics data processing is described. The graphics processing subsystem includes a geometry processor and a fragment processor, where output from the fragment processor is input compatible with the geometry processor. Data produced in a pass through a graphics data-processing pipeline including the fragment processor and geometry processor may be used as an input to processing during a subsequent pass. Data read from a texture map may be used to define or modify data, including vertex data, being processed in the geometry processor or the fragment processor.

44 Claims, 10 Drawing Sheets

SYSTEMS AND METHODS OF MULTI-PASS DATA PROCESSING

CROSS-REFERENCE TO RELATED APPLICATIONS

This application claims benefit from commonly owned U.S. Provisional Patent Application No. 60/397,150 entitled "Systems and Methods of Multi-pass Data-processing," filed Jul. 18, 2002, which is incorporated herein in its entirety by reference. This application is also related to commonly owned U.S. Provisional Patent Application No. 60/397,247 entitled "Method and Apparatus for Using Multiple Data Formats in a Unified Graphics Memory," filed Jul. 18, 2002, which is incorporated herein in its entirety by reference. This application is also related to commonly owned U.S. patent application Ser. No. 10/302,465 entitled "Programmable Graphics System and Method Using Flexible, High-Precision Data Formats," filed Nov. 22, 2002 and Ser. No. 10/386,751 entitled "Method and Apparatus for Processing Stencil Data Using a Programmable Graphics Processor," filed Mar. 11, 2003 each of which is incorporated herein in its entirety by reference.

FIELD OF THE INVENTION

One or more aspects in accordance with the invention generally relate to data processing, and more specifically, to multi-pass data-processing pipelines relating to graphics processing.

DESCRIPTION OF THE BACKGROUND

Conventional, multi-pass data processing is exemplified in computer graphics systems and methods. In the computer graphics field, data is processed using a multi-pass data-processing pipeline in which each pass performs a sequence of operations on the data. Processed data, for example color or depth values for pixels, may be stored as a texture map for re-use in a conventional multi-pass data-processing system.

In computer graphics, multi-pass methods generally create image data, in a first pass, that are then used as input in a subsequent pass. For example, in the first pass an image may be rendered by a graphics data-processing pipeline and stored in a frame buffer as image data. The image data is then used, for example, as a texture map, in a subsequent pass, to generate new image data, which can then be used in another pass through the pipeline, producing new data in a frame buffer, and so on and so forth. The end result of the multi-pass process is a final image in a frame buffer for optional display to a user. A graphics processor having a graphics pipeline architecture is described further herein for purposes of clarity with respect to a "first pass" through a graphics pipeline to generate initial image data and a "second pass" or subsequent pass through a graphics pipeline to generate display image data. However, it should be understood and appreciated that "passes" involve a sequence of operations which may be done with a multi-processor/multi-engine graphics processor architecture instead of a graphics pipeline processor architecture.

Geometry processors are hardware components configured to accept a specific format for vertex information. More particularly, vertex information may be of a fixed or floating-point data length with sufficient precision for image rendering. However, after vertex information is processed in a graphics processor to provide image data, for example to generate color and depth (z) values for pixels to be rasterized to be scanned out for display or stored in graphics memory, such stored image data is no longer in such a specific format for use by a geometry processor. Additionally, image data to be scanned out for display does not involve the precision associated with geometry processing, and thus data lengths, as associated with data precision, for image data are shorter than vertex information data lengths. Accordingly, as is described further herein, this stored image data is obtained from graphics memory by a host processor and translated into vertex information in such a specified format for re-use by a geometry processor. Such translated image data may be stored in graphics memory for later use by a graphics processor or provided more directly from a host processor to a graphics processor. Though graphics memory is described in terms of local memory or frame buffer memory, it should be appreciated that graphics memory may be shared memory of host memory.

Reflection mapping is an example of a multi-pass process of the prior art. In a first pass through a graphics data-processing pipeline, an image is rendered using a viewpoint located at a position occupied by a reflective object in a scene. The rendering results in an intermediate red-green-blue (RGB) image that is stored in a frame buffer. In the second pass, the RGB image generated in the first pass is used as a reflection map, a particular type of texture map. In the second pass, the scene is rendered, and surface normals (normal vectors) of the reflective object, along with vectors from the viewpoint to each point on the reflective surface, are used to compute texture coordinates to index the reflection map to the surface of the reflective object. Hence, this example includes two passes, a first pass to generate a reflection map by rendering an image from a first vantage point; and a second pass to render the scene to produce a final image, using the reflection map to color (texture) the reflective object.

Shadow mapping is another multi-pass method of the prior art. In shadow mapping, a depth-only image is first rendered from the vantage point of each light source. The resulting image data is then used while rendering an entire scene from the viewpoint of an observer. During the rendering of the scene, the depth-only images are conditionally used to include each of the corresponding light sources when computing a color value, that includes lighting, for each pixel or pixel fragment.

FIG. 1 is a block diagram illustrating a prior art General Computing System generally designated 100 and including a Host Computer 110 coupled through a bus disposed on a motherboard of Host Computer 110, such as External Bus 115, to a Graphics Subsystem 120. Though a direct memory access (DMA) connection between Host Processor 114 and Interface 117 is illustratively shown, Graphics Subsystem 120 may be connected to Host Memory 112 via an input/output (I/O) hub or controller (not shown) as is known. Host Computer 110 is, for example, a personal computer, server, computer game system, or computer-based simulator, including a Host Processor 114. A Host Memory 112 of Host Computer 110 may be used to store geometric data representative of one, two, three, or higher-dimensional objects. For example, Host Memory 112 may store x, y, z data representing locations of surface points in "object space." These x, y, z data are often associated with u, v data relating each surface point to a color or texture map. Host memory 112 may store information relating the relative positions of objects and a viewpoint in "world space." In some instances Host Computer 110 is configured to tessellate the x, y, z, data to generate a vertex-based representation of primitives that represent a surface to be rendered.

Graphics Subsystem 120 receives data from Host Memory 112 through an Interface 117. The bandwidth of Interface 117 is limited by External Bus 115, which is typically a peripheral bus, e.g., accelerated graphics port (AGP) or peripheral component interface (PCI) coupled to Host Memory 112 of Host Computer 110. A Memory Controller 130 manages requests, initiated by hardware components of Graphics Subsystem 120, to read from or write to a Local Memory 135. Communication between Interface 117 and Memory Controller 130 is through an Internal Bus 145. Geometry Processor 140 is designed to operate on the types of data received from Host Computer 110. For example, Memory Controller 130 receives vertex data via Interface 117 and writes this data to Local Memory 135. Subsequently, Memory Controller 130 receives a request from the Geometry Processor 140 to fetch data and transfers data read from Local Memory 135 to Geometry Processor 140. Alternatively, Geometry Processor 140 may receive data directly from Interface 117. In some prior art graphics subsystems (not shown), a DMA processor or command processor receives or reads data from Host Memory 112 or Local Memory 135, and in some prior art graphics subsystems (not shown) Graphics Subsystem 120 is integrated into an I/O hub or I/O controller, where graphics memory is shared with Host Memory 112 though some Local Memory 135 may be provided.

Geometry Processor 140 is configured to transform vertex data from an object-based coordinate representation (object space) to an alternatively based coordinate system such as world space or normalized device coordinates (NDC) space. Geometry Processor 140 also performs "setup" processes in which parameters, such as deltas and slopes, used to rasterize the vertex data are calculated. In some instances Geometry Processor 140 may receive higher-order surface data and tessellate this data to generate the vertex data. Geometry Processor 140 is configured to accept a specific format for vertex information. More particularly, vertex information may be of a fixed or floating-point data length with sufficient precision for image rendering.

The transformed vertex data is passed from Geometry Processor 140 to Rasterizer 150 wherein each planar primitive (e.g., a triangle or a quadrilateral) is rasterized to a list of axis-aligned and distributed grid elements (i.e., discretized) that cover an image to be rendered. The grid elements, conventionally in NDC space, are mapped onto a region of an array of pixels that represent the complete image to be rendered. Each element of the array covered by a grid element is a fragment of the corresponding image and is therefore referred to as fragment data; the fragment data is for one or more pixels or pixel fragments. Each fragment data element output by Rasterizer 150 includes associated data characterizing the surface (e.g. position in NDC, colors, texture coordinates, etc.).

Each fragment data element output by Rasterizer 150 is passed to a Texturer 155 and to a Shader 160 wherein the fragment data is modified. In one approach, modification is accomplished using a lookup table stored in Local Memory 135. The lookup table may include several predetermined texture or shading maps that may be accessed using texture coordinates as indices. An output of Shader 160 is processed using Raster Operation Unit 165, which receives the fragment data from Shader 160 and, if required, reads corresponding pixel data such as color and depth (z) in the current view for additional processing.

After performing the pixel operations involving color and z, Raster Operation Unit 165 writes the modified fragment data into Local Memory 135 through Memory Controller 130. The modified fragment data, written to Local Memory 135, is new or initial pixel data with respect to a first pass through a graphics pipeline. The pixel data is stored subject to modification by one or more subsequent fragment data written to the same pixel (memory) location or delivery to a Display 175 via Scanout 180.

Alternatively, pixel data within Local Memory 135 may be read, through Memory Controller 130, out through Interface 117. Using this approach, data in Local Memory 135 may be transferred back to Host Memory 112 for further manipulation. However, this transfer occurs through External Bus 115 and is therefore slow relative to data transfers within Graphics Subsystem 120. In some instances of the prior art, pixel data generated by Raster Operation Unit 165 may be read from Local Memory 135 back into Raster Operation Unit 165 or Texturer 155. However, in the prior art, data generated in the graphics data-processing pipeline (i.e., Geometry 140, Rasterizer 150, Texturer 155,.Shader 165, and Raster Operation Unit 165) as output from Raster Operation Unit 165 was not accessible to Geometry Processor 140 without first being converted into a compatible format by Host Computer 110.

FIG. 2 is a flow chart illustrating a prior art method of image rendering using the General Computing System 100 of FIG. 1. In a Receive Geometry Data Step 210 data is transferred from Host Memory 112 through Interface 117 to either Local Memory 135, under the control of Memory Controller 130, or directly to Geometry Processor 140. This transfer occurs through External Bus 115, which, in comparison to data busses within Graphics Subsystem 120, has lower bandwidth. In a Process Geometric Data Step 220, performed using Geometry Processor 140, surfaces within the transferred data are tessellated, if needed, to generate vertex data and then transformed. After transformation, primitive "setup" for rasterization is performed.

In a Rasterize Step 230 performed using Rasterizer 150 fragment data is generated from vertex-based data.

In a Process Fragments Step 240 the fragment data is textured and shaded using Texturer 155 and Shader 160. In an exemplary implementation, per-vertex colors and texture coordinates (among other per-vertex attributes) are bilinearly interpolated per fragment across the primitive to compute color and z (depth) values that are output to Raster Operation Unit 165.

In a Store Pixel Data Step 250 Raster Operation Unit 165 is used to map the fragment produced in the previous step onto a pixel in Local Memory 135, optionally operating on previously-stored data at that pixel location, and, finally, depending on the result of available tests (e.g., depth test, alpha test, stencil test) in the Raster Operation Unit 165, conditionally storing the fragment data into its corresponding-pixel location in Local Memory 135. Storage occurs by writing data through Internal Bus 170. The color data generated by Raster Operation Unit 165 is typically limited to match color depth of supported displays. Data from Local Memory 135 are transferred to a display device in a Display Step 260.

FIG. 3 is a flow chart illustrating an advanced method of image rendering known as reflection mapping. In this method pixel data is first rendered for a first scene and viewpoint. A scene consists of one or more objects. The first image is then used as a texture map for shading one or more objects in a second viewpoint of the scene. The final image shows a reflection of the first scene on the surface of the object in the second viewpoint of the scene. As shown in FIG. 3, steps 210 through 250 are performed in a manner similar to that described in relation to FIG. 2. In Store Pixel Data Step 250 the first scene pixel data is stored in a region of Local Memory 135 that can be read by Texturer 155. Instead of immediately being used in Display Step 260, the data stored in Store Pixel Data Step 250 is used in a second pass through the graphics data-processing pipeline. The second pass starts with a Receive Geometry Data Step 310 wherein geometry data representing an object in the second viewpoint of the scene is received from Host Computer 110. This data is processed using Geometry Processor 140 in Process Geometric Data Step 320 and transformed into second fragment data in a Rasterize Step 330.

In a Process Fragments Step 340, the second fragment data is shaded using the first pixel data stored in Store Pixel Data Step 260. This shading results in an image of the first scene on the surface of an object in the second viewpoint of the scene. The shaded second pixel data is stored in a Store Pixel Data Step 350 and optionally displayed in a Display Step 260.

Due to the specified dynamic range and precision of the numerical values (i.e., the formats) associated with data busses or graphics data processing elements within Graphics Subsystems 120, heretofore data had to be converted, if feasible, by Host Processor 114 of Host Computer 110 to facilitate date re-use. For example, color values written into Local Memory 135 are 24-bit RGB fixed integer data strings, making those values incompatible with Geometry Processor 140 using values representing vertices or surfaces, where data lengths are conventionally longer than 24-bits and which may use floating-point values. Heretofore, for Geometry Processor 140 to process data written by Raster Operations Unit 165, Host Processor 114 read and formatted such data to produce data formatted for input to Geometry Processor 140. Notably, data formatted for Geometry Processor 140 could be provided to graphics subsystem 120 via External Bus 115; however, in addition to the above-mentioned drawbacks, this use consumes performance dependant bandwidth between Host Computer 110 and Graphics Subsystem 120. Therefore, it would be desirable and useful to increase flexibility for data re-use by a graphics subsystem. Additionally, it would be desirable and useful to improve system level performance by providing data re-use with less dependence on such performance dependent bandwidth.

SUMMARY OF THE INVENTION

New systems and methods for the processing of graphical data are disclosed. The systems include a graphics data-processing pipeline configured to generate vertex data that can be used as input to a subsequent pass through the graphics data-processing pipeline. In various embodiments, the vertex data is generated and stored in a format suitable as an input to a geometry processor or a fragment processor. For example, in some embodiments, vertex data is saved in a texture data format. Vertex data may, therefore, be manipulated using techniques that were conventionally restricted to texture data. For example, in some embodiments vertex data is rendered in a first pass through the graphics data-processing pipeline and then used by the geometry processor or the fragment processor in a second pass.

A graphics subsystem includes a geometry processor configured to receive input vertex data and process the input vertex data received to produce vertex data output, a resampler configured to receive the vertex data output of the geometry processor and to generate a resampler output responsive to the vertex data output received, a fragment processor configured to receive the resampler output, to modify the resampler output and to generate a fragment processor output responsive to the resampler output received and a raster analyzer configured to receive the fragment processor output and to generate processed vertex data as output in a format compatible with the geometry processor.

Another graphics subsystem includes a geometry processor configured to receive and produce vertex data, a resampler configured to receive the vertex data produced from the geometry processor and to provide resampled data, a fragment processor configured to receive the resampled data from the resampler and to modify the resampled data to produce fragment data, a raster analyzer configured to receive the fragment data from the fragment processor and output vertex data in a format compatible with the geometry processor and a local memory configured to store the vertex data output of the raster analyzer.

A method of processing graphics data including receiving vertex data at a fragment processor and receiving first vertex perturbation data at the fragment processor. The vertex data received and the first vertex perturbation data is combined using the fragment processor to produce first perturbed vertex data.

Another method for processing graphics data including receiving vertex data, receiving control points representing a primitive surface contour and receiving shader program instructions. The shader program instructions are executed in a fragment processor to produce processed vertex data using the vertex data.

An apparatus for processing graphics data, including a geometry processor to receive primitives and configured to generate vertices responsive to the primitives received, a resampler to receive the vertices and configurable for a first mode and a second mode, wherein the first mode the resampler adapted to increase sample density of the primitives responsive to the vertices to provide polygon meshes and a fragment processor to receive the polygon meshes and to receive control points, the control points being associated with the polygon meshes, the fragment processor configured to produce patches responsive to the polygon meshes and the control points, the patches having surface contours.

A computing system including a host computer and a graphics subsystem. The graphics subsystem including a geometry processor configured to receive input vertex data from the host computer, to receive processed vertex data and to produce a vertex data output. The graphics subsystem also including a resampler configured to receive the vertex data output of the geometry processor and to generate a resampler output, a fragment processor configured to receive the resampler output, to modify the resampler output and to generate a fragment processor output, and a raster analyzer configured to receive the fragment processor output and to generate the processed vertex data as output in a format compatible with the geometry processor.

Another graphics subsystem including means for receiving input vertex data and processed vertex data and for producing a vertex data output, means for receiving the vertex data output and for generating a resampled output, means for receiving the resampled output, for modifying the resampled output and for generating a fragment output and means for receiving the fragment output and for generating the processed vertex data as output in a format compatible with the means for receiving input vertex data.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

Embodiments of multi-pass data-processing systems and methods are applicable to graphics applications, such as those described herein, and are also applicable to other multi-pass data-processing applications in which a processing pipeline is used to perform discrete operations on a data set.

Figure 4:
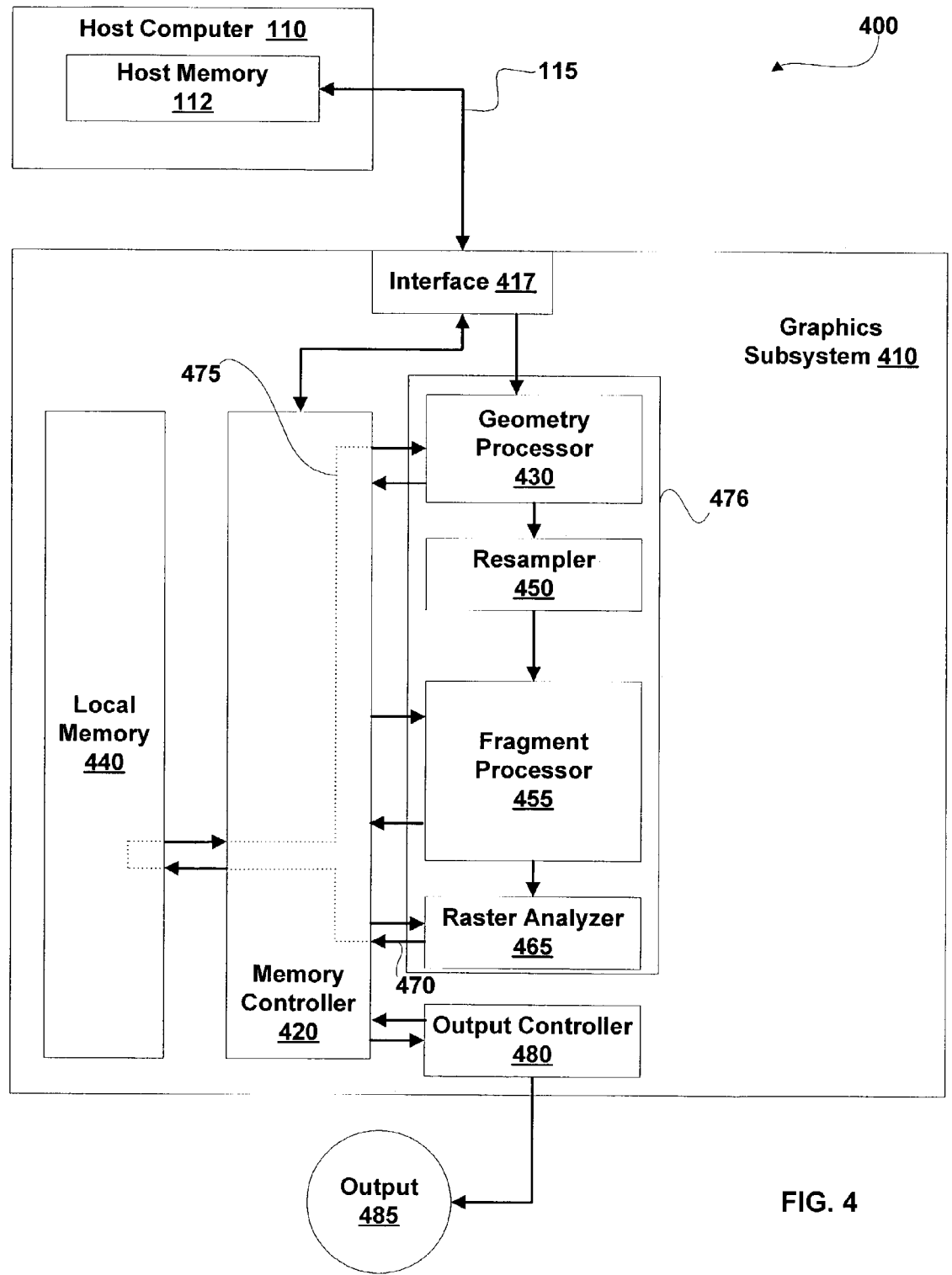
FIG. 4 is a block diagram of an exemplary embodiment of a computing system including a host computer and a graphics subsystem.

FIG. 4 is an illustration of a Computing System generally designated 400 and including a Host Computer 110 and a Graphics Subsystem 410. As described with reference to FIG. 1, Host Computer 110 may be a personal computer, laptop computer, server, game system, computer-based simulator, cellular telephone or the like. Host Computer 110 communicates with Graphics Subsystem 410 via External Bus 115 and an Interface 417. Data received by Graphics Subsystem 410 is managed by a Memory Controller 420 which may for example be configured to handle data sizes in range from 8 to more than 128-bits. For example, in one embodiment, Memory Controller 420 is configured to receive 64-bit data through interface 417 from a 64-bit External Bus 115. In this embodiment, the 64-bit data is internally interleaved to form 128 or 256-bit data types. In some embodiments, Graphics Subsystem 410 is disposed within Host Computer 110.

Data received at Interface 417 is passed to a Geometry Processor 430 or a Local Memory 440 through Memory Controller 420. Geometry Processor 430 is a programmable unit, capable of performing vector fixed or floating-point operations, or other processing device configured to receive a stream of program instructions and data. Geometry Processor 430 is configured to receive input vertex data from Host Computer 110 and processed vertex data generated in the graphics data-processing pipeline, as described further herein. Vertex data and processed vertex data may include one or more of any of the following in any combination: vertices, vertex control points representing a primitive surface contour, three-dimensional geometrical positions, normal vectors and texture coordinates in parameter space (e.g., u, v) that may be used as indices to access a data array such as a color or texture map.

Figure 1:
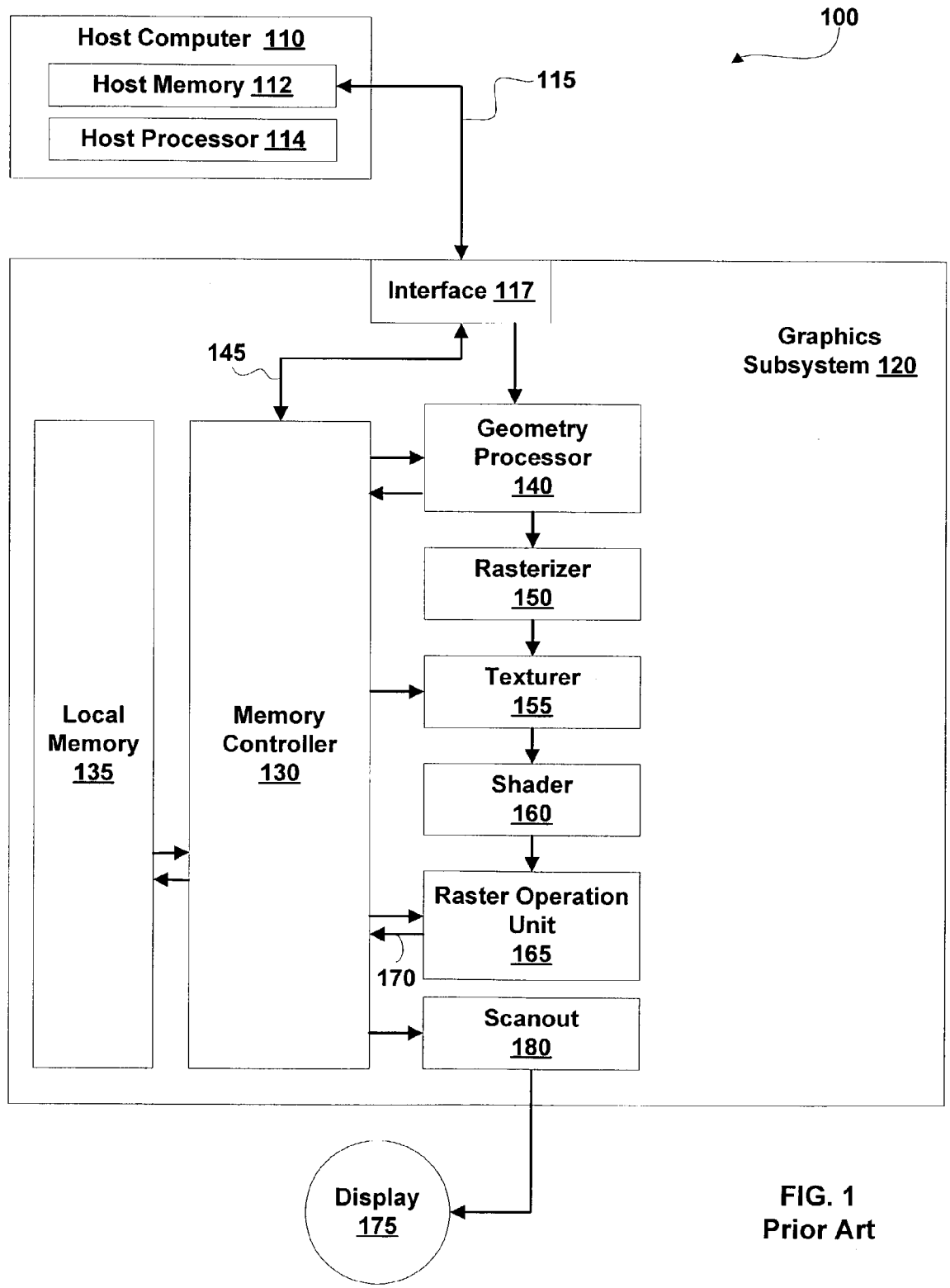
FIG. 1 is a block diagram illustrating a prior art general computing system.
Figure 2:
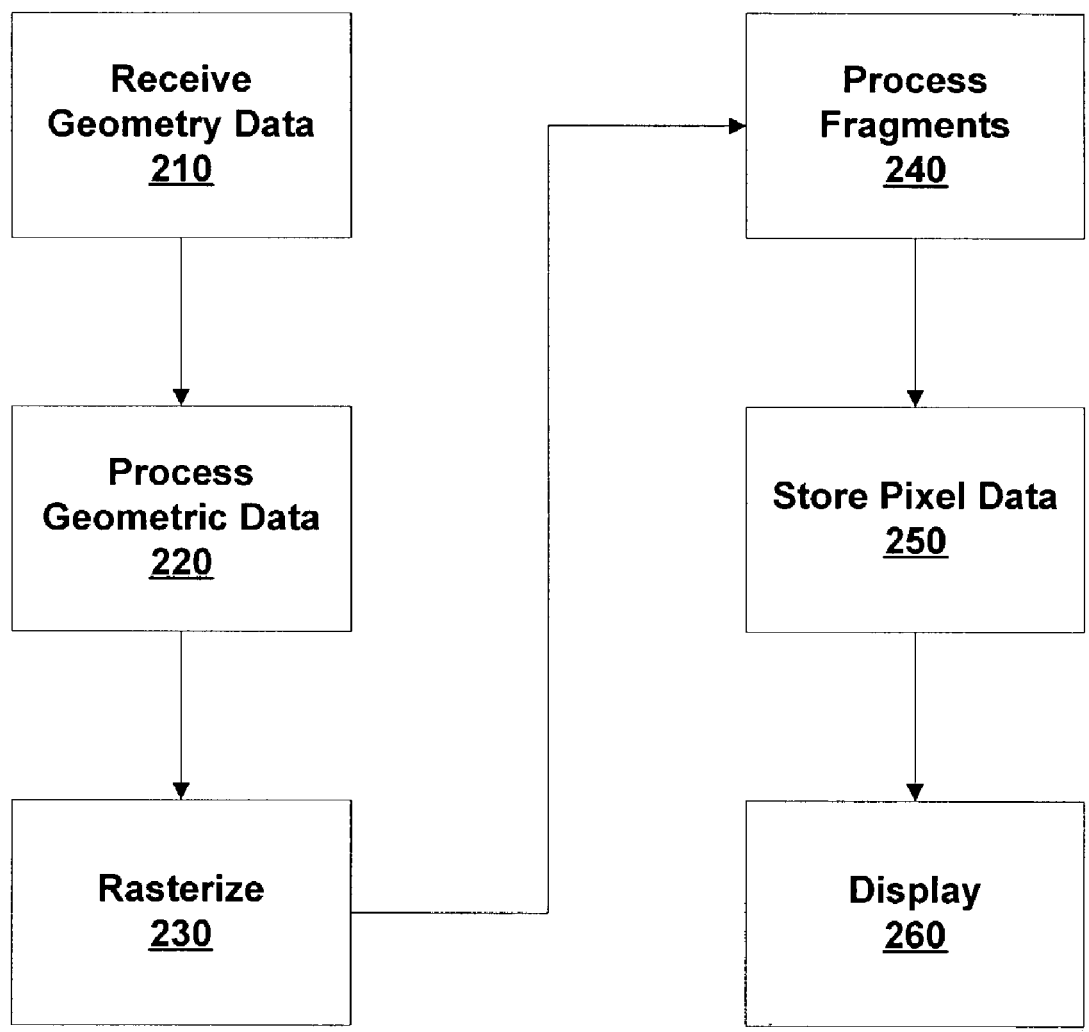
FIG. 2 is a flow chart illustrating a prior art method of image rendering using the general computing system of FIG. 1.
Figure 3:
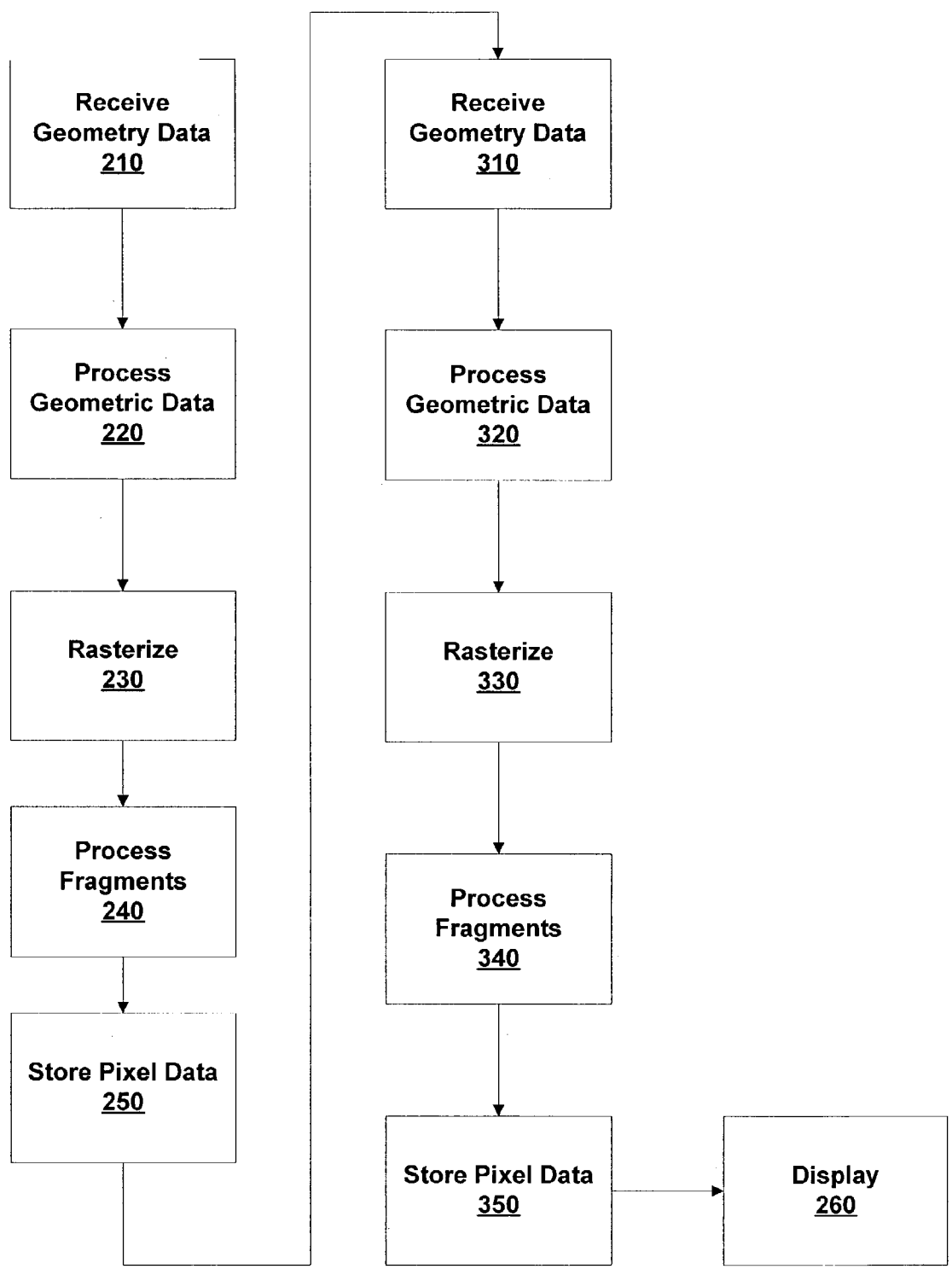
FIG. 3 is a flow chart illustrating an advanced prior art method of image rendering.

Geometry Processor 430 is configured to pass processed data, such as a vertex data output, to a Resampler 450. Resampler 450 may be configured to perform rasterization similar to prior art Rasterizer 150 (FIG. 1). However, some embodiments of Resampler 450 are configured to produce and output vertex data. In these embodiments, Resampler 450 samples vertex data, forming new primitives such as triangles, such that a new set of vertices (internal to each resampled, or rasterized primitive) is generated with a modified sample density or using a procedurally generated surface that is not necessarily a planar primitive. For example, in some embodiments, Resampler 450 is configured to generate vertices on a mesh internal to a triangular or quadrangular Bezier or non-uniform rational B-spline (NURBS) patches. In these embodiments, Resampler 450 typically operates on a set of input vertices describing a primitive and generates new samples covering the internal surface of the primitive. In various embodiments, Resampler 450 is configured to map a transformed polygon (or other type of geometry primitive) to memory locations, the memory locations corresponding to an "area" of the polygon in a two-dimensional memory. In some embodiments Resampler 450 processes and stores data, such as in Local Memory 440, in a variety of data formats. For example, in one embodiment a Graphics Data-processing Pipeline 476 operates as an OpenGL® pipeline wherein (1) the plurality of two dimensional memory structures includes a color buffer and a depth buffer; (2) the memory locations represent pixels; and (3) the "area" is a set of pixels representative of an area in a flat plane onto which the polygon is projected. However, embodiments of the invention are not limited to OpenGL® architectures and other well-known architectures. Furthermore, though Graphics Data-processing Pipeline 476 is shown, elements of such Pipeline 476 may be a multi-processor configuration instead of the pipeline architecture depicted. Resampler 450 is configured to resample primitives composed of a set of vertices (polygons) onto an abstract two or three-dimensional space, such as a two-dimensional parameter space across an otherwise curved surface. Resampled data is stored into an array of memory locations and may include a wide variety of numerical formats, including packed data types, variant records, fixed and floating-point data types and the like. In some embodiments, Resampler 450 may generate different data types on subsequent passes through the Graphics Data-processing Pipeline 476, such as in response to user specified vertex programs, shader programs, or the like. For example, in a first pass Resampler 450 may generate an initial set ("new") of vertex data at a different sampling density than the original vertex data input to Geometry Processor 430. The new vertex data is optionally generated in a format compatible with Geometry Processor 430 such that it may be used as input to Geometry Processor 430 in a second pass through Graphics Data-processing Pipeline 476. In the second pass, Resampler 450 is used to sample the new vertex data and optionally produce resulting pixel or fragment data. In some embodiments, the new vertex data may be represented in floating point data types of at least 16 bits that are compatible with Geometry Processor 430. In alternative embodiments, the new vertex data may be represented in fixed point data types of at least 8 bits that are compatible with Geometry Processor 430.

Output of Resampler 450 is coupled to a Fragment Processor 455. Fragment Processor 455 is programmable to perform at least the functions of texturing, shading and generating a fragment processor output. However, in addition to texturing and shading, Fragment Processor 455 is configured to operate on vertex, fragment, pixel or other data, responsive to shader program instructions. Thus, Fragment Processor 455 is user programmable with respect to data type, where program instructions for example may be provided using an application program interface (API) in conformity with one of the above-mentioned well-known architectures. For example, mapping techniques, such as multiple levels of detail (LOD), may be applied to vertex data in various embodiments of Fragment Processor 455.

Data processed by Fragment Processor 455 is passed to a Raster Analyzer 465 that is configured to perform well-known raster operations, such as stencil buffering, blending, and logic operations, among other known raster operations for pixels, and optionally save the result in Local Memory 440. Fragment Processor 455 generates pixel data, such as color, alpha and depth, or processed vertex data as output. Fragment Processor 455 processed vertex data is provided to Raster Analyzer 465. Output of Raster Analyzer 465 is compatible (e.g., can be accepted as input to and processed by) with Geometry Processor 430, and may be stored in Local Memory 440. The precision of data generated by Graphics Data-processing Pipeline 476 need not be reduced for storage in Local Memory 440. For example, in various embodiments, the output of Raster Analyzer 465 is data represented in 8, 16, 32, 64, 128, 256-bit or higher precision, fixed or floating-point formats. Data may be written from Raster Analyzer 465 to Local Memory 440 either through multiple write operations or through an Internal Bus 470 more than eight bits wide. For example, in one embodiment Raster Analyzer 465 outputs 128-bit floating-point data to Local Memory 440 using four write operations.

In various embodiments Memory Controller 420, Local Memory 440, or Geometry Processor 430 are configured such that data generated at various points within Graphics Data-processing Pipeline 476 can be provided to Geometry Processor 430 as input. For example, in some embodiments, the output of Raster Analyzer 465 is transferred along a Data Path 475. Data Path 475 may or may not include passage through Local Memory 440. For example, as output of Raster Analyzer 465 may include floating-point data types, such output data may be passed to Geometry Processor 430 and reprocessed. Thus, this multi-pass data processing is not subject to precision loss as initial, interim and resultant data may be passed through portions of Graphics Data-processing Pipeline 476 and stored in Local Memory 440 without loss of precision.

When processing is completed, an Output 485 of Graphics Subsystem 410 is provided using an Output-Controller 480 such as conventional Scanout 160 of FIG. 1. Output Controller 480 is optionally configured to deliver output to a display device, network, electronic control system, other Computing System 400, Graphics Subsystem 410, or the like. Output Controller 480 may perform format conversion, for example, converting 32-bit floating-point numbers to 8-bit fixed point for input to a digital-to-analog converter. In one embodiment Output Controller 480 provides floating-point vertex data to a Graphics Subsystem 120 or another Graphics Subsystem 410. In these embodiments, Local Memory 440 is optionally shared by several Graphics Data-processing Pipelines 476. Thus, a second Graphics Data-processing Pipeline 476 may be used to perform a second data-processing pass.

In some embodiments, Geometry Processor 430 and Fragment Processor 455 are optionally programmable to perform a variety of specialized functions. In graphics applications these functions may include table lookups, scalar and vector addition, multiplication, division, coordinate-system mapping, calculation of vector normals, tessellation, calculation of derivatives, interpolation, and the like. In general applications, such as those not involving graphical data, these functions may also include regression, extrapolation, derivative calculation, integration, summation, cross-product calculations, matrix manipulation, encryption/decryption, correlation, multiplexing and Fourier and other transforms, among others. Geometry Processor 430 and Fragment Processor 455 are optionally configured such that different data-processing operations are performed in subsequent passes through Graphics Data-processing Pipeline 476. In alternative embodiments, Geometry Processor 430 and Fragment Processor 455 encompass Resampler 450 and Raster Analyzer 465, respectively.

Figure 5:
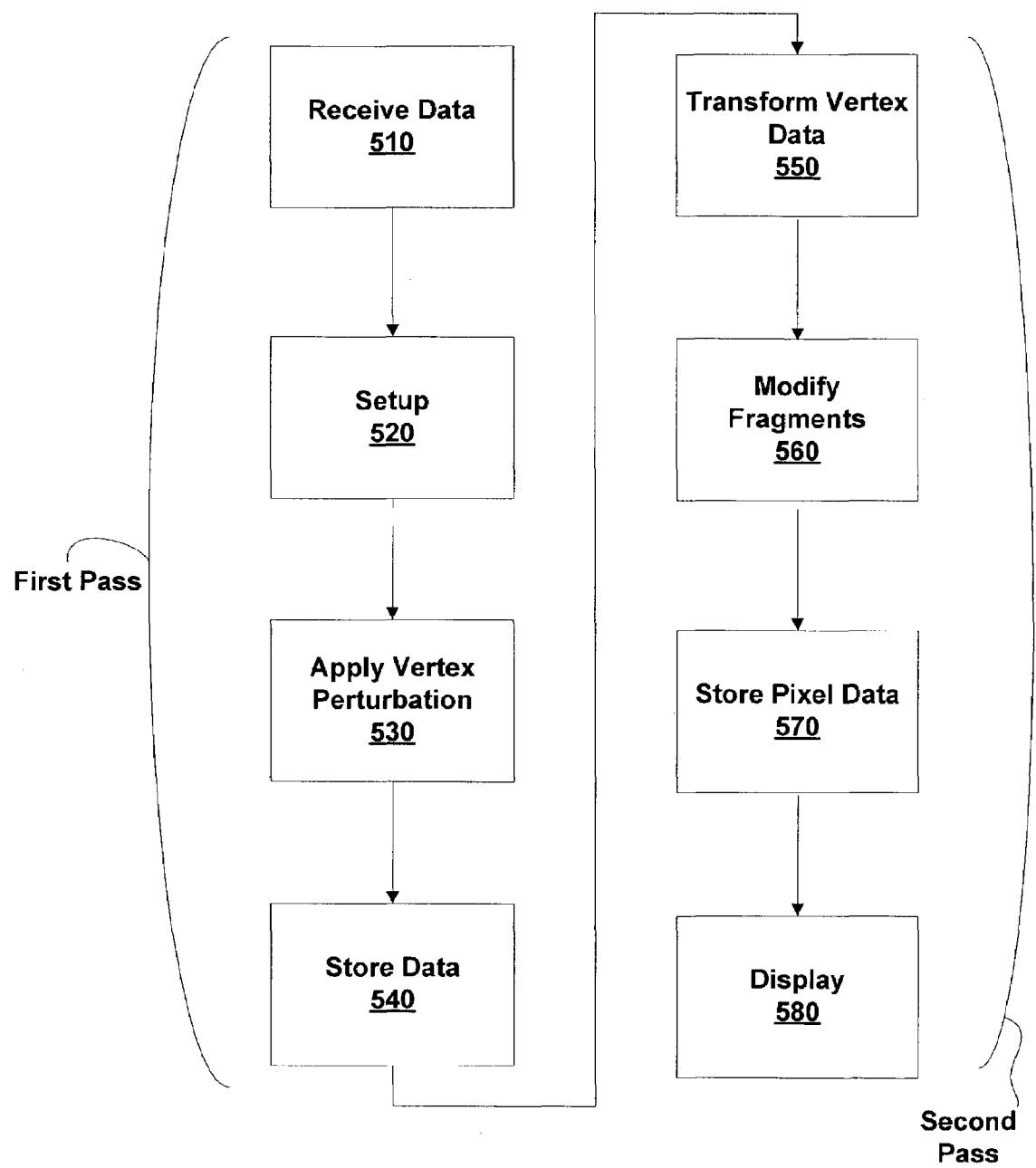
FIG. 5 is a flow diagram of an exemplary embodiment of graphics data processing utilizing the system illustrated in FIG. 4.

FIG. 5 illustrates an exemplary embodiment of graphics data processing utilizing the system illustrated in FIG. 4. The methodology described is specific to the manipulation of graphics data but includes principles applicable to other applications. Generally, the method includes processing data using more than one pass through Graphics Data-processing Pipeline 476 of FIG. 4. During each pass, different operations may be performed on the graphics data.

In a Receive Data Step 510, geometry data is received from external memory such as Host Memory 112. The geometry data typically includes vertex data representative of three-dimensional geometrical positions and normals in object space (e.g., Pg, Ng), and texture coordinates in parameter space (e.g., u, v) that may be used as indices to access a data array such as a color or texture map. The received data is passed to Geometry Processor 430 wherein an optional Setup Step 520 is performed.

Setup Step 520 includes calculation of parameters, such as gradients, depth and object orientation, relating to a specific viewpoint. Such parameters are typically used for rasterization. Setup Step 520 may include generation of vertex data if the received geometry data includes higher-order primitives such as NURBS surfaces, Bezier patches, subdivision surfaces or the like. In some embodiments, generation of vertex data includes further tessellation of triangles, quadrilaterals, polygonal meshes, or other primitives. Setup Step 520 may be done using Geometry Processor 430. Following Setup Step 520, the vertex data is passed through Resampler 450 to Fragment Processor 455. In some embodiments Setup Step 520 is delayed until a second pass through Graphics Data-processing Pipeline 476. In these embodiments, the geometry data received in Receive Data Step 510 is passed through Geometry Processor 430 without calculation of parameters related to viewpoint;

In an Apply Vertex Perturbation Step 530, Fragment Processor 455 perturbs the vertex data it receives. Apply Vertex Perturbation Step 530 is an operation on vertex data rather than on fragment data. In various embodiments, this operation includes the application of functions such as smoothing, displacement, and scaling. For example, in some embodiments linear displacement is applied to a subset of the vertices. The displacement may be in the direction of a fixed vector, along surface normal vectors (geometric normals, $N_g$), or normal to a two or three-dimensional curve. The subset of vertices is optionally determined using a two or three-dimensional map or analytical function applied to the vertices. For example, in one embodiment a height field, represented as a two-dimensional map, is applied to displace the vertices along a common vector by an amount specified by the height field. In another example, wherein an analytical function is applied, the subset of vertices consists of vertices having a certain feature, such as vertex density or curvature range. In one embodiment the analytical function results in a displacement responsive to surface curvature. In Apply Vertex Perturbation Step 530, surface geometry is changed rather than merely altering surface appearance using shading.

In some embodiments, Apply Vertex Perturbation Step 530 includes use of values retrieved from a predefined two-dimensional or three-dimensional lookup table stored in Local Memory 440. The lookup table may include several sets of data intended for use at different image or object resolutions (e.g., levels of detail). In one embodiment this table is the map containing a height field as discussed above. In an operation, data is read from the lookup table and mapped to or projected onto an object surface. The modifications of Apply Vertex Perturbation Step 530 are performed using Fragment Processor 455 and are applied to vertex data rather than fragment data. In this operation Fragment Processor 455 operates on vertices, for example to tessellate, and thus Fragment Processor 455 does not necessarily operate on fragment data at all for this operation. For example, Fragment Processor 455 receives control points defining a bicubic patch and (s,t) height field indices from Resampler 450. A shader program executed by Fragment Processor 455 produces vertex data output representing vertices on the surface of the bicubic patch using the control points and map indices. The modifications applied in Apply Vertex Perturbation Step 530, may include the geometry perturbations described above rather than application of a color map or texture as occurs during conventional fragment shading.

Vertex perturbation in Apply Vertex Perturbation Step 530 is optionally responsive to the position and orientation of an object in world coordinates. For example, in some embodiments more than one lookup table is stored in Local Memory 440, each table having perturbation data appropriate for a specific final image resolution. In these embodiments, a lookup table is selected responsive to a depth parameter (such as associated with the object and the current point of view), a resolution of Output 485 (FIG. 4), or the orientation of a surface relative to the current point of view. In some embodiments, data used for vertex perturbation is processed or pre-filtered before being used to modify vertices. For example, a magnitude of perturbation is optionally scaled responsive to the depth parameter. Thus, vertex perturbation may include perspective corrections. Further examples of vertex data perturbation are discussed further herein with reference to FIG. 8.

In an optional Store Data Step 540, the vertex data perturbed in Apply Vertex Perturbation Step 530 is stored in Local Memory 440 using Raster Analyzer 465. Storage takes place through Internal Bus 470 and Memory Controller 420 and may be performed so as to retain the full precision of the vertex data. For example, if Geometry Processor 430 and Fragment Processor 455 operate on the vertex data as a 128-bit floating-point data type, then 128-bit floating-point data are preferably stored in Local Memory 440. In some embodiments each datum is written using several write operations. In other embodiments several datum are written using a single write operation. Store Data Step 540 concludes a first pass through Graphics Data-processing Pipeline 476. The output of the first pass through Graphics Data-processing Pipeline 476 may be vertex data stored in Local Memory 440 or passed directly, without being stored in Local Memory 440, to Geometry Processor 430 for a second pass. Graphics Subsystem 410 is configured such that this vertex data can be passed through Graphics Data-processing Pipeline 476 more than once.

In a Transform Vector Data Step 550, the processed vertex data, having been passed through Graphics Data-processing Pipeline 476 a first time, is received by Geometry Processor 430. Geometry Processor 430 can process data generated by other elements of Graphics Data-processing Pipeline 476 where such data generated, and optionally stored, is in an input compatible format for Geometry Processor 430. In Transform Vector Data Step 550 Geometry Processor 430 transforms the perturbed vertex data computed in the first pass from object space to normalized device coordinates (NDC) or world space. The vertex data is "setup" respective to the current orientation and viewpoint and rasterized to a fragment array using Resampler 450. In other embodiments, not including Store Data Step 540, vertex data is transferred from Raster Analyzer 465 to Geometry Processor 430 without being stored in Local Memory 440, such as by passing through Memory Controller 420.

The fragment data generated by Resampler 450 are modified in an optional Modify Fragments Step 560. This modification includes, for example, application of texture and shading to individual fragments, or the like. In a Store Pixel Data Step 570, Raster Analyzer 465 is used to write the fragment data to Local Memory 440 in a format that can be considered pixel data. Store Pixel Data Step 570 optionally includes storage of floating-point data types or fixed point data types, including data types of 32 bits or larger. The second pass through Graphics Data-processing Pipeline 476 is typically concluded with Store Pixel Data Step 570. In an optional Display Step 580, the data is displayed through Output Controller 480 to Output 485.

In an implementation of the method illustrated by FIG. 5, Geometry Processor 430 is used to perform at least two different operations (in steps 520 and 550) involving the manipulation of vertex data. The computational units within Geometry Processor 430 do not have to be substantially reconfigured to perform these operations. Likewise, Fragment Processor 455 is used to perform two operations (in steps 530 and 560) that may involve modification of data using values retrieved from a lookup table. Steps 530 and 560 are differentiated in that in Step 530 operations occur on vertex data and in Step 560 operations occur on fragment data. In the illustrated embodiments, efficiency may be enhanced by configuring Fragment Processor 455 to operate on vertex data as well as fragment data. One benefit of this implementation is that the graphics subsystem can be used to perform computations, such as displacement mapping, without Host Processor 114 (FIG. 1) intervening usage or using additional specialized elements in Graphics Processor 430.

Each pass through Graphics Data-processing Pipeline 476 does not necessarily involve use of every programmable processor. For example, in some embodiments, a specific programmable processor may be used on alternate passes. In some embodiments data may be directed through Graphics Data-processing Pipeline 476 more than two times or Graphics Data-processing Pipeline 476 may include more than two programmable processors, so that fewer passes would be used to generate the same image.

Figure 6:
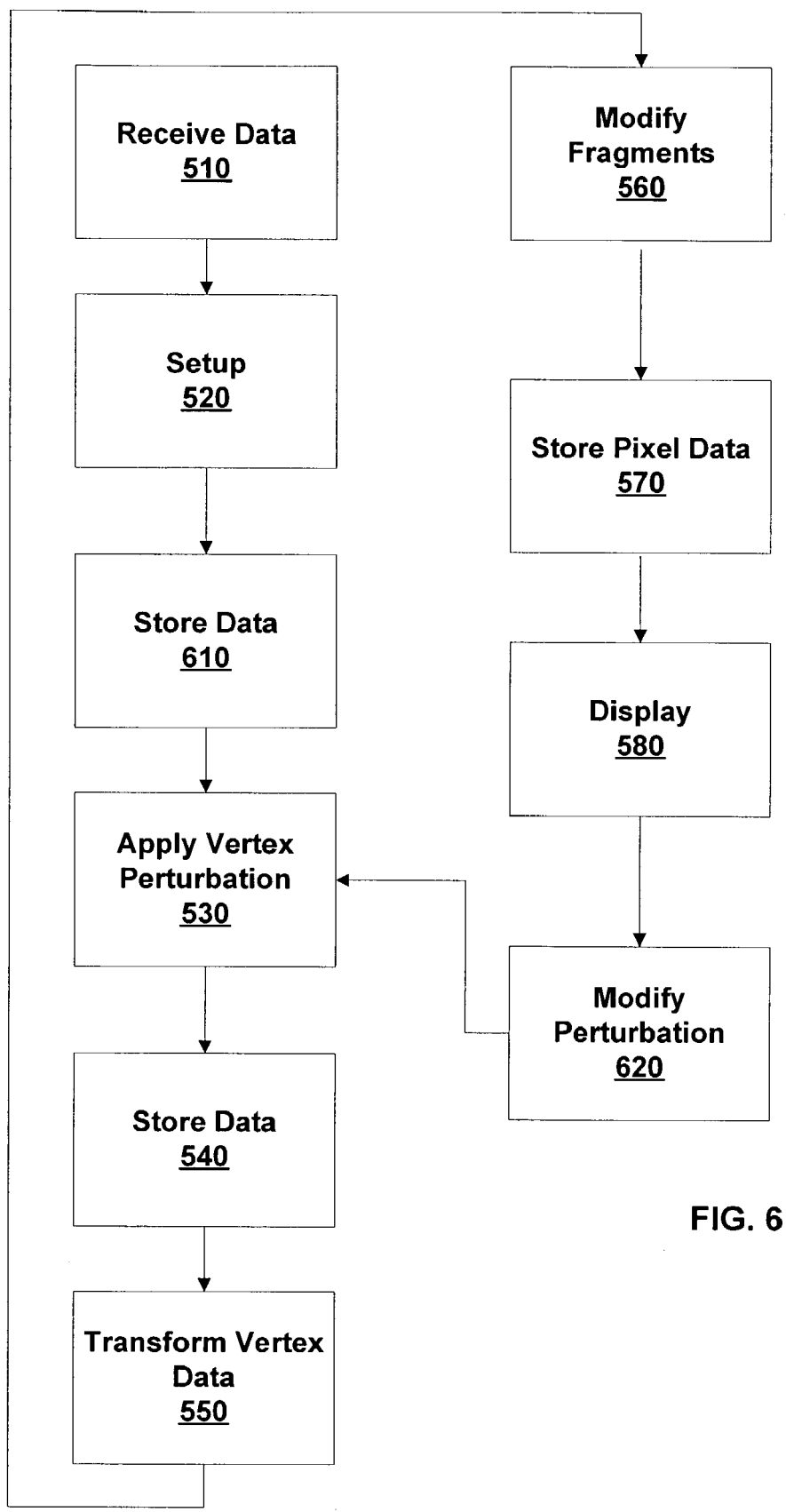
FIG. 6 is a flow diagram of an exemplary embodiment of a method that utilizes abilities to perturb vertex data prior to conversion to pixel data and to pass data generated in a graphics data-processing pipeline to a programmable data processor.

FIG. 6 illustrates an exemplary embodiment of a method that utilizes the ability of Graphics Subsystem 410 to process data using multiple passes through Graphics Data-processing Pipeline 476. In this embodiment, perturbed vertex data generated in a first pass through Graphics Data-processing Pipeline 476 is used as input to Geometry Processor 430 in the first step of a second pass. In this method, Steps 510 and 520 are first performed as discussed with reference to FIG. 5. A Store Data Step 610 is then performed prior to Apply Vertex Perturbation Step 530 so that this state of the data may later be retrieved. In Store Data Step 610, the vertex data is saved in Local Memory 440 with or without loss of precision. Steps 530 through 580 are then performed as described in relation to FIG. 5. Display Step 580 is followed by a Modify Perturbation Step 620 in which the lookup table, function or other data, used to perturb vertex data in Apply Vertex Perturbation Step 530, is altered such that the next application of Apply Vertex Perturbation Step 530 will generate a different result. When a subsequent image is to be displayed, the method returns to Apply Vertex Perturbation Step 530 where the new perturbations are applied to vertex data stored in Store Data Step 610. This process allows a surface geometry to be modified without repetition of Step 520 or retrieval of previously generated data from Host Memory 112 to reduce computation time. In some cases this is possible even if the object is moved relative to the viewpoint since the vertex data stored in Store Data Step 610 is optionally in object space. FIG. 6 illustrates an example wherein vertex data is altered to represent a different geometry, where the new geometry is rendered for display, without retrieval of data from Host Memory 112.

In one embodiment, the method illustrated in FIG. 6 is applied to a graphical representation of a human face. A first vertex representation of the entire face is received from Host Memory 112 and vertex perturbations are repeatedly applied to simulate the movement of lips and eyes. Processing time is saved because geometry data representing the entire face, or even all segments of the geometry being perturbed, need not be repeated each time the geometry is changed. In some embodiments the vertex perturbations are applied to the entire graphical representation.

Figure 7:
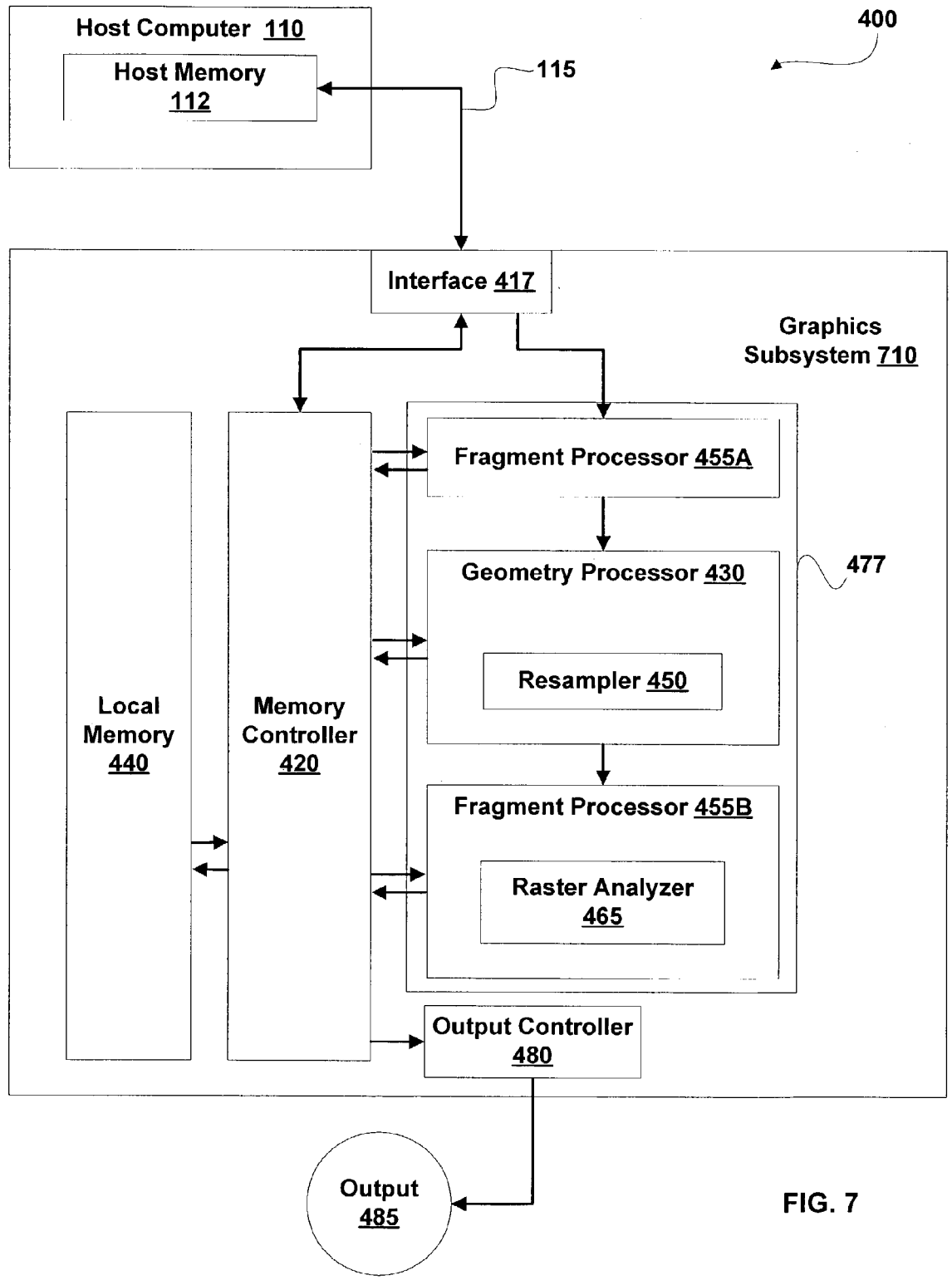
FIG. 7 is a block diagram of an exemplary embodiment of a graphics subsystem including a graphics data-processing pipeline including three programmable processors configured in series.

Alternative embodiments of Graphics Subsystem 410 include more than two programmable data processors arranged in series or in parallel. These embodiments may also be configured to store intermediate results from each of the programmable data processors in Local Memory 440. FIG. 7 illustrates an alternative embodiment of Graphics Subsystem 410, designated 710, including a Graphics Data-processing Pipeline 477 including three programmable processors 455A, 430, 455B configured in series. Again, though a pipeline architecture is shown, programmable processors 455A, 430, 455B need not be configured in series but may be configured as a multi-threaded multi-processor architecture. Each programmable processor is optionally configured to read or write partially-processed (intermediate result) data to and from Local Memory 440. Interface 417 is configured to receive vertex data from Host Memory 112 and provide the data to a first Fragment Processor 455 designated 455A. Fragment Processor 455A is configured to perform Apply Vertex Perturbation Step 530 of FIG. 5. The perturbed vertex data is output to an embodiment of Geometry Processor 430 including Resampler 450 and configured for the execution of Transform Vector Data Step 550. A second Fragment Processor 455 designated 455B is configured to receive the transformed data from Geometry Processor 430 and perform Modify Fragments Step 560. The alternative embodiment of Graphics Subsystem 410, Graphics Subsystem 710, illustrated in FIG. 7 is capable of performing the method of FIG. 5 using a single pass through Graphics Data-processing Pipeline 477.

Figure 8A:
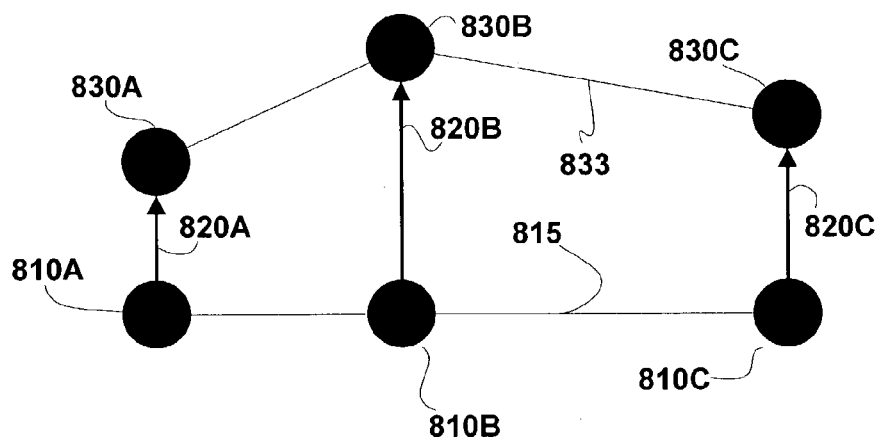
FIGS. 8A through 8C are vertex diagrams depicting exemplary perturbations of vertex data, such as may occur in an apply vertex perturbation step of FIG. 5.
Figure 8B:
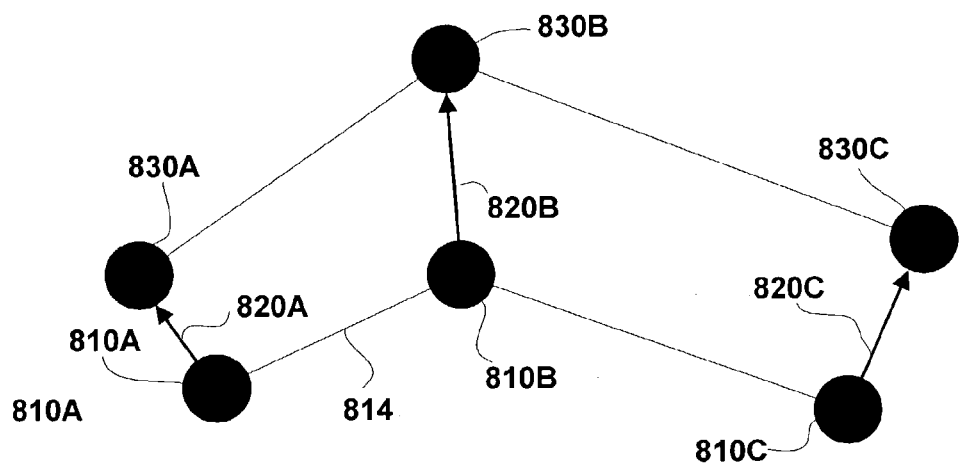
Figure 8C:
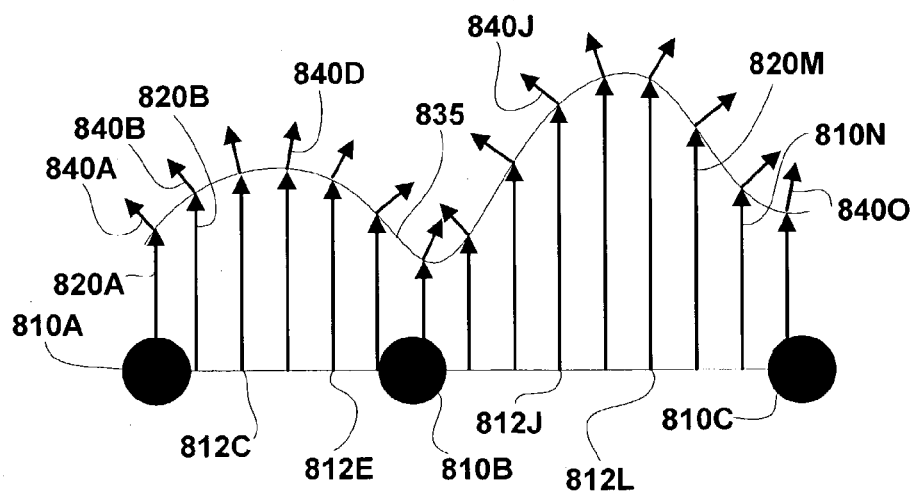

FIGS. 8A through 8C illustrate perturbation of vertex data, such as may occur in Apply Vertex Perturbation Step 530 (FIG. 5). FIG. 8A shows an embodiment in which three vertices 810A–810C of a planar surface 815 are displaced into new positions 830A–830C describing a new non-planar surface 833. The perturbation of the three vertices 810A–810C optionally occurs along normal vectors 820A–820C of planar surface 815. In alternative embodiments, the displacement occurs in a direction other than that of the normals to a surface. This perturbation is accomplished using a displacement map optionally including a height field. Each of the displacement vectors 820A–820C is oriented in the same direction but has a length responsive to the height field. For example, in this embodiment, displacement vector 820B is longer than displacement vector 820A.

FIG. 8B illustrates an embodiment of vertex perturbation of a non-planar surface 814 in which displacement occurs in the direction dependent on characteristics of each vertex. In this case, displacement vectors 820A–820C are orientated along the normal vectors (Ng) associated with vertices 810A–810C, respectively. Vertices and displacement distances are selected using a displacement map having a height field. In alternative embodiments, the normal vectors used to determine the direction of displacement vectors are optionally derived from other surfaces, geometries, or vertex data.

FIG. 8C illustrates an embodiment of vertex perturbation in which displacement is made to a two-dimensional curve or three-dimensional surface. This example also shows how the density of vertices may be changed during perturbation by using the Resampler 450 to amplify geometry data (generating new data points that will correspond to vertices when fed back through Graphics Data-processing Pipeline 476 of Graphics Subsystem 430). Three co-planar vertices 810A–810C describing a triangle, perpendicular to the plane of the figure, are resampled into new data points 812A–812O internal to the triangular region. Each new data point 812A–812O, representing a vertex that will be fed back through Graphics Data-processing Pipeline 476, is displaced along corresponding normal vector 820A–820O to form a Curve 835. Each displaced data point 812A–812O results in a new vertex along curve 835. These vertices are associated with new geometric normals 840A–840O and represent a new surface which is no longer planar. This approach to vertex perturbation may produce a non-planar surface from a planar surface. The distance each data point 812A–812O is displaced may be determined, for example, from a lookup table, from an analytical function, or from Curve 835.

The generation of new vertex data, such as vertices 812A–812O illustrated in FIG. 8C, may be accomplished using Resampler 450 to generate new data inside planar primitives (flat triangles or quadrilaterals). Since new vertices generated internal to the rasterized primitive are sent back through Graphics Data-processing Pipeline 476 and are interpreted in a subsequent pass as vertices, Graphics Data-processing Pipeline 476 generates vertices or performs tessellation of the input primitive using Geometry Processor 430. In addition to tessellating flat primitives, Graphics Data-processing Pipeline 476 can also tessellate higher-order surfaces, such as Bezier and NURBS patches, by evaluating the corresponding analytical expression determining the shape of the patch, when evaluating the position and normal for each generated vertex. This evaluation process is performed with a shader program that computes the corresponding function in Fragment Processor 455. Fragment Processor 455 is then also used to apply a perturbation (displacement along the per-vertex geometry normal) to these new vertices as illustrated in FIGS. 8A through 8E. This perturbation displaces the new vertices out of the plane of vertices 810A–810C and to Curve 835.

In the paradigm described above, a curved object can have an abstract parameter space (u, v) placed on its surface. Polygons that approximate the shape of the curved surface are stored as a map, indexed by u and v, by the Geometry Processor 430, and the polygon vertices can be associated with independent surface normals. In a first pass of a two-pass method, when a polygon on the curved surface is resampled in the parameter space, a set of data points (fragments) are generated, and a process is performed on each fragment. The process displaces points on the curved surface (in the "flat" parameter space represented by a triangle or other polygon) to generate new points in the parameter space, which are then saved in Local Memory 440. In the second pass, since the new data points in parameter space can represent polygon vertices, the displaced points are read from the Local Memory 440, into the Geometry Processor 430, where they are transformed from the parameter space into world or object coordinates and then rendered as ordinary geometry (lighting, texturing, shading, etc.).

To render polygons represented by the displaced data points, surface normals are sometimes needed. These normals can be computed in the first pass and stored into Local Memory 440 along with the data points themselves. Hence, in one embodiment, the data records stored in a two-dimensional array of Local Memory 440, include a spatial data point (e.g., three 32-bit floating-point numbers for x, y, and z coordinates) and a surface normal vector (e.g., three 16-bit floating-point numbers for $n_x$, $n_y$, and $n_z$ normal vector components). The above displacement mapping is but one example of the broader concept of saving arbitrary sets of mixed precision values from Raster Analyzer 465 into the Local Memory 440 and then reading the saved values in the Geometry Processor 430 in a subsequent pass.

The displacements illustrated by FIG. 8C represent hierarchical displacement mapping computed using Graphics Subsystem 410. The distinction between hierarchical displacement mapping and the simple displacement mapping illustrated by FIG. 8A, refers to the type of function (geometry) that can be generated. The displacement mapping illustrated by FIG. 8A involves single-valued functions that generate one new vertex for each original vertex. In contrast, recursive hierarchical displacement mapping can generate multi-valued functions wherein more than one new vertex is generated for each original vertex. The new vertices (geometry) may be generated and displaced responsive to normals or other functions at any point on a surface represented by the original vertices. Recursive hierarchical displacement mapping enables more flexibility in the generation of surfaces and objects than simple displacement mapping. For example, recursive hierarchical displacement mapping allows for greater geometric complexity based on simple geometry and maps, and simple geometry may be reused for multiple images without being resent by the host.

After either type of displacement mapping, each new vertex is optionally associated with a new geometric normal (Ng) 840A–840O (as shown in FIG. 8C), which can be used for shading or other well-known graphics processes. The new geometric normals 840A–840O, illustrated in FIG. 8C, are optionally calculated using four derivatives representative of finite differences between a vertex and the vertex's four nearest neighbor vertices. For example, in one embodiment, in addition to perturbing the original vertices, Fragment Processor 455 is used to calculate two of the derivatives associated with a first pair of the four nearest neighbors. This is accomplished, for example, by using standard DDX and DDY instructions (i.e., instructions determining the per-component rate of change of a source, such as for color, x, y, z, u, and v, among other well-known graphics parameters, along X and Y on a display screen) in Fragment Processor 455. After the first two derivatives are calculated the vertex data is routed to the top of Graphics Data-processing Pipeline 476 for additional modification by Graphics Data-processing Pipeline 476. In this embodiment, Geometry Processor 430 applies a positional offset (i.e. one pixel in x and y) to the data so that, on the next pass through Fragment Processor 455, an identical derivative calculation will produce derivatives representative of differences between the current vertex and a second pair of the four nearest neighbors. In a third pass through Graphics Data-processing Pipeline 476 Geometry Processor 430 uses the four derivatives to calculate the geometric normals.

Figure 8D:
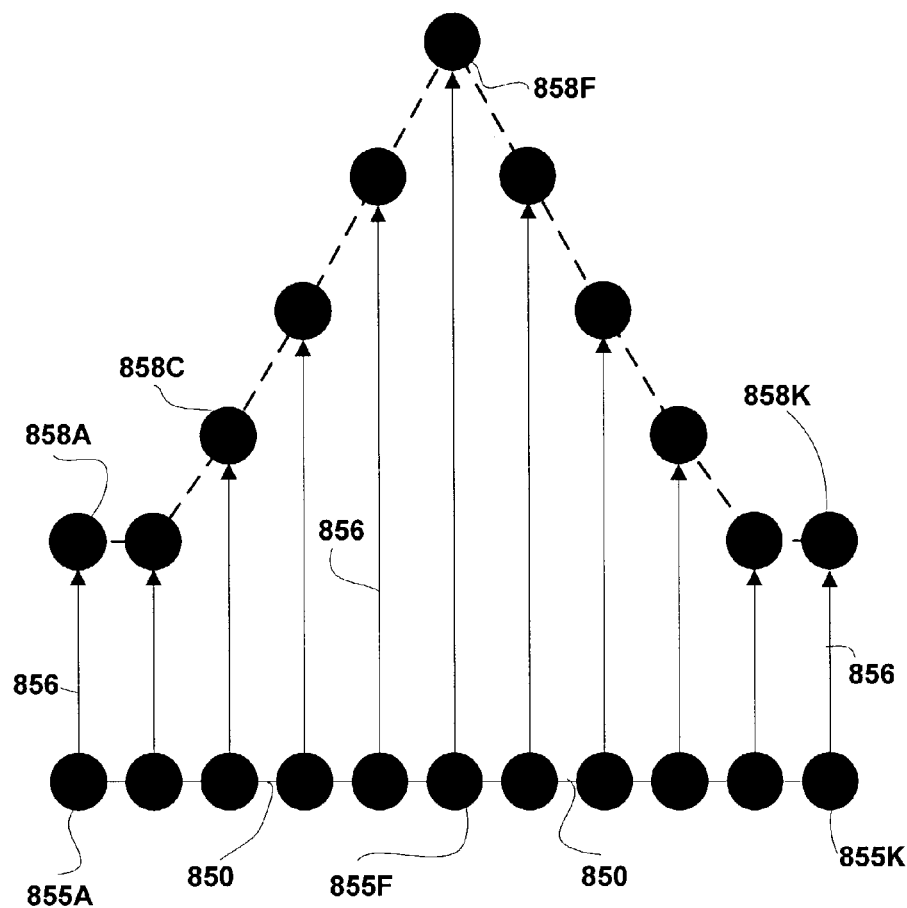
FIGS. 8D and 8E are vertex diagrams depicting an exemplary recursive hierarchical displacement mapping computed using the graphics subsystem of FIG. 4.
Figure 8E:
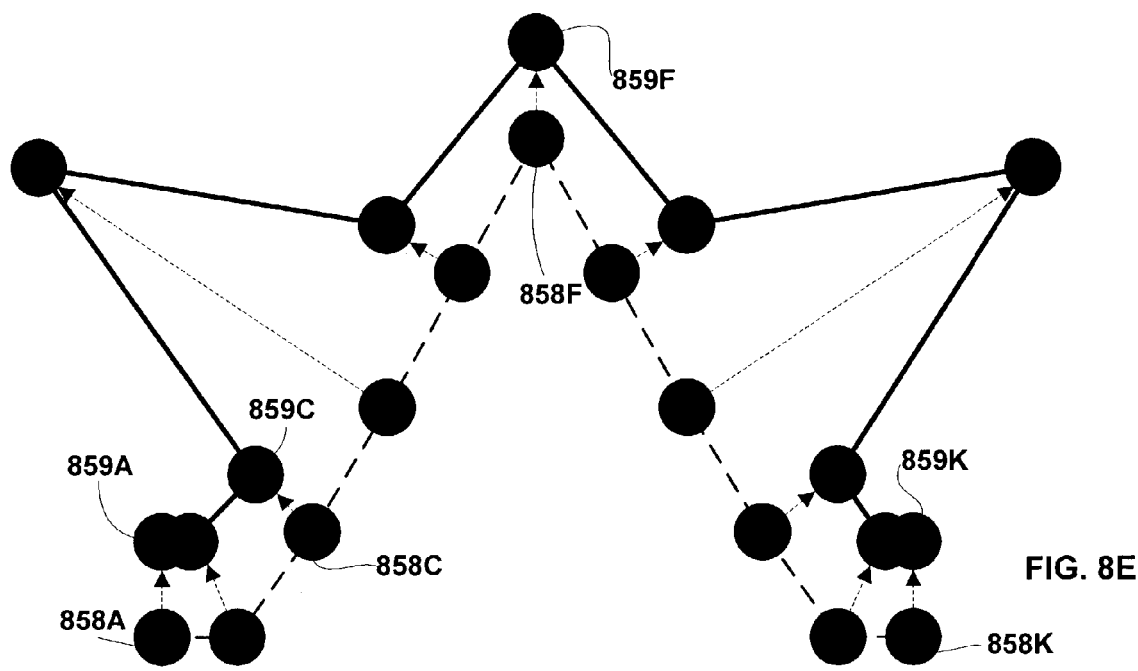

FIGS. 8D and 8E, illustrate examples of recursive hierarchical displacement. In these examples the process of displacing data points and vertex normals is applied recursively or hierarchically. In FIG. 8D, a flat surface 850 has associated vertices 855A–855K displaced along their geometric normals 856 to new positions 858A–858K in a manner similar to that described for FIG. 8A. FIG. 8E illustrates a second displacement to the same vertices from their new positions 858A–858K to third positions 859A–859K. To perform this second displacement, Graphics Data-processing Pipeline 476 receives the new positions 858A–858K and associated normals as vertices in a subsequent pass. Different displacement maps or functions may also be used for the first and second displacements.

There are a variety of ways in which vertices may be perturbed and new geometric normals (N) calculated. In some embodiments, new vertex positions (P) are calculated using $P=P_g+D*N_g$ wherein $P_g$ is an unperturbed vertex position, D is a displacement and $N_g$ is the geometric normal of the unperturbed vertex. (These embodiments, wherein the displacement is in the direction of $N_g$, are illustrated, for example, by FIG. 8B.) N is optionally calculated using a cross product as N=dPdu X dPdv, where dPdu=P(u+du, v)−P(u−du, v) and dPdv=P(u, v+dv)−P(u, v−dv). ("X" indicating cross-product.) Alternative embodiments, employing the systems of FIG. 4 and FIG. 7, are described further herein.

In one embodiment, static displacement mapping is accomplished by having geometric normals pre-computed in Host Computer 110 based on a displacement map. The pre-computed values make up a normal map and are stored as a two dimensional array in Local Memory 440, accessible to elements of Graphics Data-processing Pipeline 476. In this embodiment the first pass through Graphics Data-processing Pipeline 476 is used to calculate the displaced position of each vertex and the second pass is used to look up the pre-computed normal from a normal map and render the data. In this embodiment, geometry is displaced by a shader program running on Fragment Processor 455 that reads the pre-computed normal for each vertex from the normal map rather than computing the normal for each vertex.

In one embodiment, dynamic displacement with hardware pixel derivatives is accomplished by Graphics Data-processing Pipeline 476 receiving vertex position ($P_g$), vertex normal ($N_g$), and vertex texture coordinates (u, v) as input to the first pass. The first pass includes mapping u, v to NDC x, y, and computing the displacement (D) using a (u, v) texture lookup on the displacement map or by evaluating a displacement function. A new vertex position (P) is computed using $P=P_g+D*N_g$. Derivatives dPdx and dPdy, corresponding to dPdu and dPdv, are computed and these values are used to determine a new normal (N) by taking the average of the cross product of derivatives associated with each vertex. Output of the first pass can include D and N as four floating-point values. In this embodiment, the second pass receives D and N as input to Geometry Processor 430, which, together with $P_g$ is used to compute $P=P_g+D*N_g$ and renders the displaced scene using P and N. In dynamic displacements, in contrast to normals received with vertex data from Host Computer 110 or read from a map, the normal is calculated using derivatives, associated with pixel data, and a shader program running on Fragment Processor 455, after the positions are displaced in image space. This embodiment is an example wherein geometry is displaced by a first pass through Fragment Processor 455 and normals are recomputed on the fly. In contrast to having intervention by Host Computer 110, dynamic displacements may be rendered entirely on the Graphics Subsystem 410.

In one embodiment, dynamic displacements with corrected hardware pixel derivatives are accomplished by having the first pass receive $P_g$ and $N_g$ as input, mapping u, v to x, y, and computing D, P, dPdx and dPdy. Wherein dPdx=P (x+dx, y)−P(x−dx, y), etc. The D, dPdx and dPdy values are packed into 128-bits of data. In the second pass $P_g$ and $N_g$ are received as input, u and v are mapped to x-1 and y-1, $D_2$ and $P_2$ are calculated, and $dP_2dx$ and $dP_2dy$ are packed into 96 bits which are provided as a second output. In a third pass, the calculated dPdx, dPdy, $dP_2dx$ and $dP_2dy$ are received as input and the new normal N is calculated using $N=(dPdx+dPdy)X(dP_1dx+dP_2dy)$. ("X" indicating cross-product.) Finally, an image of the displaced scene is rendered using P and N. In this embodiment, the first and second passes are optionally combined by sending a copy of $P_g$ and $N_g$ to two different regions of Local Memory 440 and operating on both regions in each pass.

In one embodiment, dynamic displacements with improved pixel derivatives is accomplished by having the first pass through Graphics Data-processing Pipeline 476 receive as input vertex data as a tripled vertex stream: $P_g$ and $N_g$(u, v), $P_g$ and $N_g$(v+du, v), and $P_g$ and $N_g$(u, v+dv). Wherein, $N_g$(u, v) refers to the normal vector at vertex u, v on the pre-displaced surface. The first pass is used to first compute D and P(u, v), $D_2$ and $P_2$(u±du, v), and $D_3$ and $P_3$(u, v±du), and then to compute $dPdx+P_2−P$ and $dPdy+P_3−P$ and N. Output of the first pass includes D and N. In the second pass, D and N are received as input and P is calculated using $P=P_g+D*N_g$. Output of the second pass includes rendering of P and N.

In one embodiment, dynamic displacements with derivatives from texture is accomplished by having Graphics Data-processing Pipeline 476 receive $P_g$ and $N_g$ as vertex data input in a first pass. D and P are calculated using Fragment Processor 455 and P is written as output to a table, such as a texture map indexed by u and v. In the second pass, N is calculated using (P(u+du, v)−P(u−du, v))X(P(u, v+dv)− P(u, v−dv)) and provided as a second output. The four values of P are looked up using the texture map indexed by u and v. A third pass receives P and N as input and generates a rendering of P and N as an image.

Figure 9:
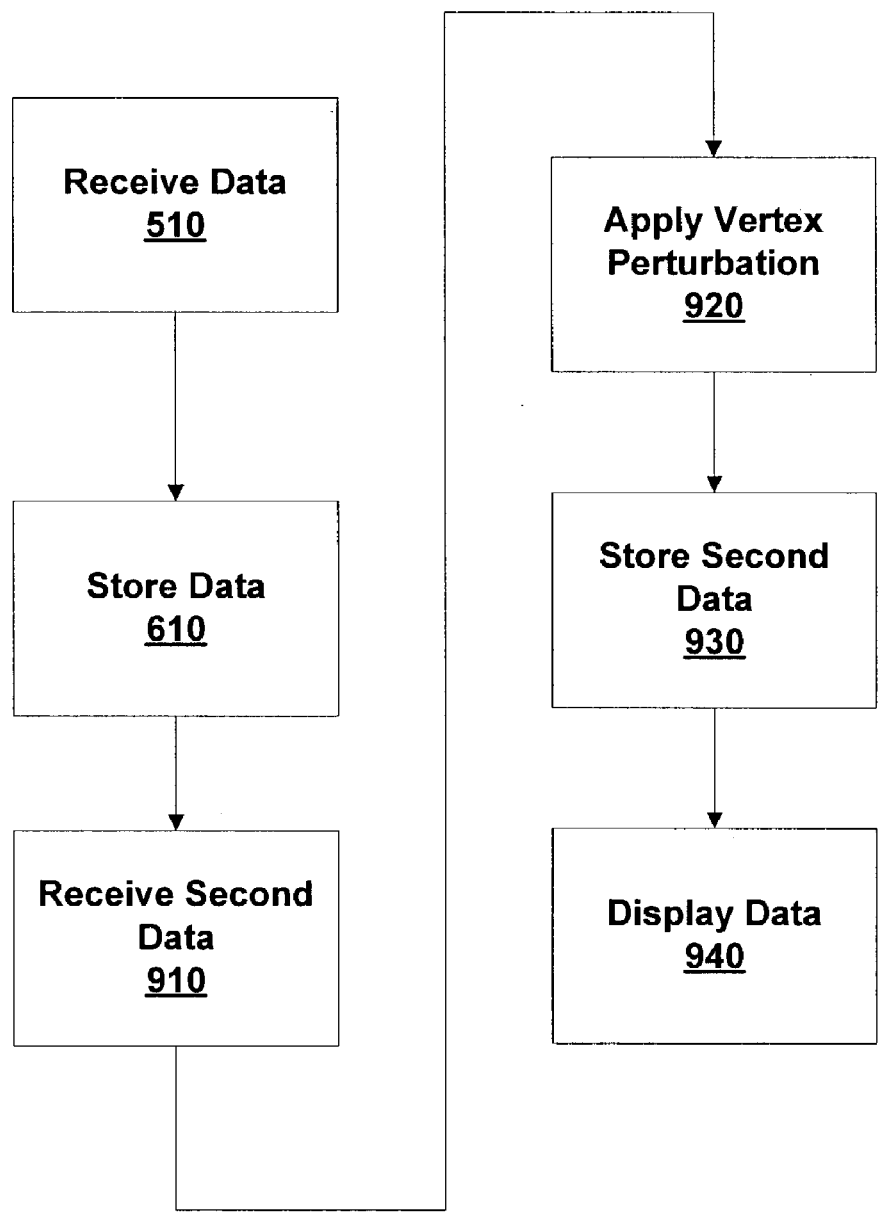
FIG. 9 is a flow diagram of an exemplary embodiment of a method whereby results generated in one pass through the processing pipeline are used to perturb vertex data in a second pass.

FIG. 9 illustrates embodiments of a method utilizing results generated in one pass through Graphics Data-processing Pipeline 476 are used to perturb vertex data in a second pass. In these embodiments steps 510 and 610 are performed as described with reference to FIGS. 5 and 6. In one embodiment, Store Data Step 610 includes storage of first vertex data representing a first surface in an indexed table which may be stored in Local Memory 440. After Storage Data Step 610, additional geometry data is received from Host Computer 110 in a Receive Second Data Step 910. The additional geometry data includes second vertex data representing a second surface.

The second vertex data is perturbed in an Apply Vertex Perturbation Step 920. In some embodiments, Apply Vertex Perturbation Step 920 is performed using Fragment Processor 455 (FIG. 4) and the vertex data is stored in a Store Second Data Step 930. In Apply Vertex Perturbation Step 920, characteristics of the first surface are imparted to the second surface by using information within the first vertex data to perturb the second surface. The information used may include, for example, normal vectors used to determine the direction of second vertex perturbation, vertex positions used to determine the direction or distance of second vertex perturbation, or the like. Apply Vertex Perturbation Step 920 may be differentiated from Apply Vertex Perturbation Step 530 in that the former uses previously received (in Receive Data Step 510) vertex data to characterize the perturbation. In one embodiment (u, v) values, associated with the first vertices, are used to look up data for determining aspects of the second vertex perturbation. The first vertex data is applied as a "texture" to the second vertex data. In these embodiments, use of one set of vertex data to perturb a second set is possible because Fragment Processor 455 is configured to receive vertex data as both vertex and "texture" input. In steps Store Second Data 930 and Display Data 940 the perturbed second vertices are optionally saved or optionally rendered and displayed.

In one embodiment of the method illustrated by FIG. 9, Store Data Step 610 includes saving vertex data to a lookup table configured for mapping or projection on to other surfaces. The lookup table may be stored in Local Memory 440. The lookup table optionally includes several different data sets, having differing data density, for use when the mapping or projection requires different resolutions or perspective corrections. One data set is optionally used for mapping to one surface while a higher density data set is used for mapping to a higher resolution surface.

New systems and methods for the processing of graphical data are disclosed. The systems include a multi-pass data-processing subsystem configured to generate floating-point data that can be reprocessed as input to a subsequent pass through the multi-pass data-processing subsystem. Reprocessing of data having floating-point precision enables multi-pass manipulation of both pixel data and vertex data. For example, in some embodiments vertex data is modified in a first pass and then rendered to pixel data in a second pass without host processor intervention. The modifications may include projections, transformations, or the like. In some embodiments vertex data processed in a first pass is subsequently used to modify other vertex data in a second pass. In some embodiments the methods and systems are applied to non-graphical data.

Various embodiments include a graphics subsystem including a geometry processor configured to receive input vertex data and processed vertex data, and to produce a vertex data output. These embodiments also include a resampler (rasterizer) configured to receive the vertex data output of the geometry processor and to generate a resampler output, a fragment processor configured to receive the resampler output, to modify the resampler output and to generate a fragment processor output, and a raster analyzer configured to receive the fragment processor output and to generate the processed vertex data as output in a format compatible with the geometry processor. These various embodiments optionally further include a local memory configured to store the processed vertex data. The resampler output received by the fragment processor is optionally vertex data. The fragment processor is optionally further configured such that input vertex data is processed using multiple passes.

Various embodiments include a method of processing graphics data including receiving-geometry data at a graphics data-processing pipeline, using the graphics data-processing pipeline to apply a vertex perturbation to the geometry data to create perturbed vertex data, converting the vertex data into fragment data, modifying the fragment data, saving the modified fragment data as pixel data, and optionally reading the new pixel data as vertex data using a geometry processor. Wherein applying a vertex perturbation and modifying the fragment data are optionally performed using separate passes through the graphics data-processing pipeline and, optionally, wherein the received geometry data is first vertex data and the created vertex data is second vertex data, the second vertex data having a greater number of vertices than the first vertex data. These various embodiments optionally further including saving the received geometry data to a local memory prior to the step of applying a vertex perturbation, retrieving the saved geometry data, and applying a vertex perturbation to the retrieved data. These various embodiments optionally further including using the graphics data-processing pipeline to calculate normals associated with the created vertex data.

Various embodiments include a method of processing graphics data including receiving geometry data at a graphics data-processing pipeline, processing the geometry data in a first pass through the processing pipeline, an output of the first pass being vertex data, and processing the vertex data in a second pass through the graphics data-processing pipeline, an output of the second pass being pixel data. Wherein the step of processing the geometry data optionally includes re-sampling vertex data using a resampler, an output of the resampler being second vertex data. The second vertex data optionally including more vertices than the re-sampled vertex data. Various embodiments include a method of processing graphics data including receiving vertex data, receiving control points representing a primitive surface contour, receiving shader program instructions and executing the shader program instructions in a fragment processor to produce processed vertex data using the vertex data and the control points. For example, in some embodiments, Resampler 450 is configured to generate vertices on a mesh internal to a triangular or quadrangular Bezier or NURBS patch. In these embodiments, Resampler 450 typically operates on a set of input vertices describing a primitive and generates samples within the primitive.

Various embodiments include a graphics subsystem including a geometry processor configured to receive vertex data, a resampler configured to receive vertex data from the geometry processor and optionally produce fragments, a fragment processor configured to receive data from the resampler and to modify the received data, a raster analyzer configured to receive the data modified by the fragment processor and output vertex data in a format compatible with the geometry processor, and a local memory configured to store the vertex data output of the raster analyzer.

Various embodiments include a computing system including a host computer and a graphics subsystem as described above.

Several embodiments are specifically illustrated or described herein. However, it will be appreciated that modifications and variations are covered by the above teachings and within the scope of the appended claims without departing from the spirit and intended scope thereof. For example, in alternative embodiments, the methods illustrated by FIGS. 6, 7, and 9 are performed using the systems illustrated by FIG. 7. In some embodiments, systems and methods of the invention are optionally adapted to process-other types of data. In these embodiments vertex data are replaced by other vector data to be processed, re-processed, resampled, or otherwise manipulated.

While foregoing is directed to embodiments in accordance with one or more aspects of the present invention, other and further embodiments of the present invention may be devised without departing from the scope thereof, which is determined by the claims that follow. Claims listing steps do not imply any order of the steps unless such order is expressly indicated.

All trademarks are the respective property of their owners.

OpenGL is a registered trademark of Silicon Graphics, Inc.

We claim:

1. A graphics subsystem, comprising:
  a geometry processor configured to receive input vertex data and process the input vertex data received to produce vertex data output;
  a resampler configured to receive the vertex data output of the geometry processor and to generate a resampler output responsive to the vertex data output received;
  a fragment processor configured to receive the resampler output, to modify the resampler output and to generate a fragment processor output responsive to the resampler output received;
  a raster analyzer configured to receive the fragment processor output and to generate processed vertex data as output in a format compatible with the geometry processor; and
  a data path providing the raster analyzer output to the geometry processor whereby processed vertex data may be fed back to the geometry processor.

2. The graphics subsystem of claim 1, further comprising a local memory configured to store the processed vertex data.

3. The graphics subsystem of claim 1, wherein the resampler output received by the fragment processor comprises vertex data.

4. The graphics subsystem of claim 1, wherein the geometry processor is configured to receive the processed vertex data.

5. The graphics subsystem of claim 1, wherein the processed vertex data output of the raster analyzer is of a floating-point data type of at least 32 bits.

6. The graphics subsystem of claim 1, wherein the processed vertex data output of the raster analyzer is of a floating-point data type of at least 16 bits.

7. The graphics subsystem of claim 1, wherein the processed vertex data output of the raster analyzer is of a fixed-point data type of at least 16 bits.

8. The graphics subsystem of claim 1, wherein the processed vertex data output of the raster analyzer is of a fixed-point data type of at least 8 bits.

9. The graphics subsystem of claim 1, wherein the fragment processor is configured to read color data or alpha data from local memory.

10. The graphics subsystem of claim 9, further comprising a shader program configured to specify blending operations to be performed by the fragment processor using the color data or the alpha data.

11. An apparatus as in claim 5, wherein the fragment processor is configurable with shading instructions for producing the pixel data.

12. A graphics subsystem as claimed in claim 1, wherein the geometry processor is configured to receive the input vertex data from a host computer, and processed vertex data from an output of either the resampler or the raster analyzer.

13. A method as claimed in claim 12, wherein the processed vertex data is fed back to the geometry processor without intervention by the host computer.

14. A method as claimed in claim 13, wherein the data in a format compatible with the geometry processor is in a floating point format.

15. A graphics subsystem as claimed in claim 12, including a local memory configured to store vertex data output by either the raster analyzer or the resampler.

16. A method as claimed in claim 1, wherein the processed vertex data is fed back to the geometry processor without intervention by the host computer.

17. A graphics subsystem as claimed in claim 1, wherein the fragment processor is programmable to perform one or more of the functions of texturing, or shading.

18. A graphics subsystem, comprising:
a geometry processor configured to receive and produce vertex data;
a resampler configured to receive the vertex data produced from the geometry processor and to provide resampled data;
a fragment processor configured to receive the resampled data from the resampler and to modify the resampled data to produce fragment data;
a raster analyzer configured to receive the fragment data from the fragment processor and output vertex data in a format compatible with the geometry processor;
a local memory configured to store the vertex data output of the raster analyzer; and
a data path providing the raster analyzer output to the geometry processor whereby processed vertex data may be fed back to the geometry processor, or stored in the local memory before transfer to the geometry processor.

19. An apparatus for processing graphics data, comprising:
a geometry processor to receive primitives and configured to generate vertices responsive to the primitives received;
a resampler to receive the vertices and configurable for a first mode and a second mode, wherein the first mode the resampler adapted to increase sample density of the primitives responsive to the vertices to provide polygon meshes;
a fragment processor to receive the polygon meshes and to receive control points, the control points being associated with the polygon meshes, the fragment processor configured to produce patches responsive to the polygon meshes and the control points, the patches having surface contours a raster operations unit coupled to the fragment processor to receive the patches, the raster operations unit configured to output vertex data in a format input compatible with the geometry processor; and a data path providing the raster operations unit output to the geometry processor whereby processed vertex data may be fed back to the geometry processor.

20. An apparatus as in claim 19, further comprising memory coupled to receive the patches and coupled to provide the patches to the geometry processor.

21. An apparatus as in claim 19, wherein the resampler is configurable for a second mode, the resampler in the second mode configured to map the vertices in association with locations in the memory to provide mapped vertices, the locations in memory defining areas associated with pixels.

22. An apparatus as in claim 21, wherein the fragment processor is configured to generate pixel data responsive to the mapped vertices.

23. An apparatus as in claim 22, wherein the pixel data includes at least one of color data, alpha data and depth data.

24. An apparatus as in claim 22, wherein the control points and the primitives are received from a host computer.

25. An apparatus as in claim 19, wherein the fragment processor is configurable with shading program instructions for producing the patches.

26. An apparatus as in claim 25, wherein the raster operations unit is part of the fragment processor.

27. An apparatus as in claim 26, wherein the resampler is part of the geometry processor.

28. An apparatus as in claim 27, further comprising another fragment processor to receive the patches for perturbation, the other fragment processor configured to provide the patches after perturbation to the geometry processor.

29. An apparatus as in claim 28, wherein the geometry processor is configurable with vertex program instructions.

30. An apparatus as in claim 29, wherein the other fragment processor is user programmable.

31. A computing system, comprising:
a host computer; and
a graphics subsystem, the graphics subsystem including:
a geometry processor configured to receive input vertex data from the host computer, to receive processed vertex data and to produce a vertex data output,
a resampler configured to receive the vertex data output of the geometry processor and to generate a resampler output,
a fragment processor configured to receive the resampler output, to modify the resampler output and to generate a fragment processor output,
a raster analyzer configured to receive the fragment processor output and to generate the processed vertex data as output in a format compatible with the geometry processor, and
a data path providing the raster analyzer unit output to the geometry processor whereby processed vertex data may be fed back to the geometry processor.

32. A graphics subsystem, comprising:
means for receiving input vertex data from a host processor and processed vertex data and for producing a vertex data output;
means for receiving the vertex data output and for generating a resampled output;

means for receiving the resampled output, for modifying the resampled output and for generating a fragment output;

means for receiving the fragment output and for generating the processed vertex data as output in a format compatible with the means for receiving input vertex data; and means for providing the format compatible output to the means for receiving input vertex data whereby the format compatible output may be fed back to the receiving input vertex data without intervention by a host processor.

33. A method for multipass graphics processing of vertex data without invention by a host processor comprising:

providing input vertex data from the host processor to a geometry processor and processing the input vertex data to produce a vertex data output;

providing the output of the geometry processor to a resampler configured to sample the output vertex data and form primitives;

providing the output data of the resampler to a fragment processor generating a fragment processor output;

providing the output of the fragment processor to a raster analyzer to generate processed vertex data as output in a format compatible with the geometry processor; and providing the output of the raster analyzer as an input to the geometry processor for processing by the geometry processor.

34. A method as claimed in claim 33, wherein providing the vertex data output from the raster analyzer to the geometry processor is without intervention by the host processor.

35. A method as claimed in claim 34, wherein the output of the raster analyzer is stored in local memory to be provided to the geometry processor without intervention by the host processor.

36. A method as claimed in claim 33, wherein the processing by the resampler generates the vertex data comprising a new set of vertices with a modified sample density.

37. A method as claimed in claim 36, wherein the resample processor maps a transformed polygon or other type of geometry primitive to a memory location corresponding to an area of the polygon in two-dimensional memory in the local memory.

38. A method as claimed in claim 33, wherein the resampler processing generates new vertex data using a procedurally generated surface that is not necessarily a planar primitive.

39. A method as claimed in claim 38, wherein the resampler processing generates vertices on a mesh internal to a triangular or quadrangular Bezier or nonuniform rational B-spline (NURBS) patch.

40. A method as claimed in claim 39, wherein the resampler processing operates on a set of input vertices describing a primitive, and generates new samples covering the internal surface of the primitive.

41. A method as claimed in claim 33, wherein the resampler processing generates vertex data in a format compatible with the geometry processor, the output of the resampler in a first pass being used as an input to the geometry processor, the geometry processor and the resampler operating on the new vertex data to produce data input to the fragment processor.

42. A method as claimed in claim 41, wherein the processing by the fragment processor includes mapping using one of multiple levels of detail.

43. A graphics system as claimed in claim 42, wherein the resampler provides the resampler output to the data path connected to the geometry processor.

44. A method as claimed in claim 33, wherein the processing by the fragment processor includes texturing and shading.

* * * * *

UNITED STATES PATENT AND TRADEMARK OFFICE
CERTIFICATE OF CORRECTION

PATENT NO. : 7,081,895 B2  Page 1 of 1
APPLICATION NO. : 10/411940
DATED : July 25, 2006
INVENTOR(S) : Papakipos et al.

It is certified that error appears in the above-identified patent and that said Letters Patent is hereby corrected as shown below:

Column 22, Claim 19, Line 3: Insert a semicolon after "contours"

Signed and Sealed this

Sixth Day of March, 2007

JON W. DUDAS
*Director of the United States Patent and Trademark Office*